United States Patent Office 3,127,421
Patented Mar. 31, 1964

3,127,421
MIXED ACID NITRATION OF DISPERSIONS OF CRUDE DIBENZANTHRONE
Joseph S. Milazzo, Palisades Park, David I. Randall, New Vernon, and John H. Shown, Westfield, N.J., assignors to General Aniline & Film Corporation, New York, N.Y., a corporation of Delaware
No Drawing. Filed Dec. 1, 1959, Ser. No. 856,371
4 Claims. (Cl. 260—353)

This invention relates to a new and improved process for producing a direct dyeing black dyestuff, more particularly a dyestuff of the dibenzanthrone series.

A number of processes are known for the preparation of direct dyeing black dyestuffs of the dibenzanthrone series, which term is inclusive of dibenzanthrone, isodibenzanthrone and halogen substituted derivatives thereof. Included among such processes are methods involving nitration of the dibenzanthrone or dibenzanthronyl followed by fusion with caustic alkali. This fusion step is costly and time-consuming. In U.S. Patent No. 2,831,871, a process is disclosed which has as one of its objects the elimination of this fusion step, but this process must be carried out under very carefully controlled conditions and with relatively costly materials, and the dyeings produced with the products of such process do not have the desired jet black colorations, being navy blue or other shades of black.

In previous methods for producing a vattable dyestuff by nitration of a dibenzanthrone compound, it has always been deemed necessary to first purify the dibenzanthrone to remove non-vattable impurities. This has been accomplished by vatting the crude dibenzanthrone resulting from the fusion of benzanthrone in caustic soda or caustic potash in order to solubilize the dibenzanthrone, filtering off the insoluble non-vattable impurities, oxidizing the vatted dibenzanthrone to precipitate the oxidized form of the dibenzanthrone, filtering off the soluble impurities, and washing the dyestuff. The resulting dibenzanthrone is generally referred to as pure or technically pure dibenzanthrone.

This preliminary purification process is expensive and time consuming. It is an object of this invention to provide a process for producing a direct dyeing black dyestuff of the dibenzanthrone series which will not be subject to the above described disadvantages. Other objects and advantages will appear as the description proceeds.

The attainment of the foregoing objects is made possible by our discovery that when the crude dibenzanthrone resulting from caustic fusion of benzanthrone is directly nitrated without the preliminary purification, not only is the process rendered more economical, but the process enables the attainment of even further improved and unexpected results. More particularly, the invention comprises subjecting a dispersion in sulfuric acid of a crude mixture resulting from the caustic fusion of the benzanthrone to treatment with a nitrating acid. It has been found that this process enables the production of dyestuffs which dye cellulose fibers from the ordinary alkaline hydrosulfite vat in black shades which do not require aftertreatment of the dyed material to develop the color. Further, the process of this invention is highly economical, efficient, and readily operated, requiring no specialized equipment and using only the most basic raw materials. Nor is any aftertreatment of the nitrated dibenzanthrone resulting from the process of this invention necessary.

Further, the process of this invention is not only highly advantageous in eliminating the necessity for the costly preliminary purification of the crude dibenzanthrone, but the present process also unexpectedly results in a considerable improvement in yield amounting to up to 20% without affecting the over-all quality of the dyestuff. In some instances, in fact, properties of the dyestuff such as chlorine-fastness and the like are further improved as compared with the product produced by nitration of the purified dibenzanthrone.

The exact reasons for the operativeness of the present process and the improved and unexpected results attained thereby are not fully understood, and the following theories are postulated without of course limiting the invention thereto:

(1) Nitration in the presence of sulfuric acid oxidizes and/or sulfonates the impurities to render them water soluble whereby they are readily separated in the subsequent filtration of the drowned nitration medium.

(2) The impurities exert a catalytic effect to assist in the nitration of the dibenzanthrone.

(3) The impurities are converted by the treatment into colored bodies enhancing the yield and/or color value of the dyestuff.

As compounds of the dibenzanthrone series which may be treated in accordance with this invention, the product resulting from the fusion of benzanthrone in caustic soda or caustic potash is preferred. This crude product is generally a mixture of dibenzanthrone combined with minor amounts of isodibenzanthrone and unknown impurities. Generally, when analyzed spectrophotometrically and compared with technically pure dibenzanthrone, this crude dibenzanthrone mixture is found to contain about 70 to 85% dibenzanthrone, 5 to 10% isodibenzanthrone and 5 to 20% unknown impurities.

The process of this invention is also applicable to the treatment of crude isodibenzanthrone, as for example produced by the caustic fusion of dibenzanthronyl sulfide or brombenzanthrone, and to the corresponding crude monohalo substituted (chlorine, bromine) dibenzanthrone and isodibenzanthrone mixtures.

The above described fusion process may be carried out in any manner well known in the art, for example as disclosed in U.S. Patent 809,892, etc. The fusion of the dibenzanthrone compound may be carried out with caustic soda, caustic potash, alcoholic caustic soda, alcoholic caustic potash, or the like.

The crude dibenzanthrone compound being nitrated may be dispersed in any desired amount and concentration of sulfuric acid, although it will of course be understood that amounts of acid higher than necessary to suspend or dissolve the dibenzanthrone compound would be uneconomical. Optimum results are obtained by nitrating the dibenzanthrone in accordance with the process disclosed and claimed in the copending application of Milazzo and Shown, Serial No. 856,369, now abandoned, filed on even date herewith. Such process involves subjecting a slurry of the dibenzanthrone compound in sulfuric acid having a concentration of about 40 to 65% to treatment with about 20 to 65 parts of mixed nitration acid for each 45 parts of dibenzanthrone compound.

The crude dibenzanthrone compound, in accordance with this invention, is dispersed (dissolved or slurried) in sulfuric acid ranging in concentration from about 40 to 100%, preferably about 40 to 65%. It is preferred to first dissolve the crude dibenzanthrone mixture in a substantially minimum amount of crude concentrated sulfuric acid, such as 95% concentration or more, followed by dilution with water, preferably gradually, until the preferred acid concentration of 40 to 65% is reached. Within this above range, a concentration of acid of about 60% has been found to be most effective, efficient and economical.

When the slurry or mixture is prepared by first dissolving the crude dibenzanthrone mixture in concentrated sulfuric acid followed by dilution with water, at least about 9 parts of acid (calculated as 100% conc.) is generally employed per part of crude dibenzanthrone mixture, more acid being economically undesirable but operative. The crude dibenzanthrone mixture is only slightly soluble in the 40 to 65% sulfuric acid medium required herein and most of the crude material accordingly exists therein in finely dispersed or suspended form. In the resulting slurry, about 14 to 28 parts of the 40 to 65% sulfuric acid per part of crude dibenzanthrone mixture are generally present, although here again, more acid is operative but economically undesirable. During preparation of this slurry, temperatures should, though not necessarily, be kept below about 75° C. in order to facilitate and expedite the subsequent nitration reaction carried out at temperatures below about 75° C. Room temperatures are entirely satisfactory, temperatures of about 18 to 30° C. being usual, although lower temperatures may be employed if desired.

The dispersion of crude dibenzanthrone in sulfuric acid is then subjected to treatment with nitric acid to produce a dibenzanthrone dyestuff nitrated in any desired degree. The amount of nitric acid employed in this nitrating treatment will of course depend upon the degree of nitration desired. If less than one mole of nitric acid per mole of crude dibenzanthrone is employed, a mixture of unnitrated and mononitrodibenzanthrone is produced. Higher proportions of nitric acid ranging up to say four moles per mole of dibenzanthrone will correspondingly produce mixtures containing higher proportions of mono-, di-, and tri-nitrated dibenzanthrones. It is generally preferred to employ about 1.25 to 4.0 moles of nitric acid per mole of crude dibenzanthrone. The nitric acid may be added as such to the sulfuric acid dispersion, but it is preferred to add the nitric acid in the form of mixed nitration acid, this being well known as composed of about one third nitric acid and two thirds sulfuric acid. In this preferred embodiment, the mixed nitration acid is employed in proportions of about 20 to 65 parts, depending upon the extent of nitration desired in the final product, for each 45 parts of crude dibenzanthrone.

The nitric acid or mixed nitration acid, in the above described proportions, is added to the crude dibenzanthrone dispersion in sulfuric acid and the resulting mixture maintained at a temperature of no more than about 75° C. and down to room temperature or less, and preferably about 35 to 40° C. until the nitration is completed. To facilitate such temperature control and to minimize oxidation of the dibenzanthrone, the mixed nitration acid is preferably added to the crude dibenzanthrone dispersion gradually over a period of about 1 to 3 hours with agitation after which the reaction is allowed to proceed to completion also with agitation. An additional 3 to 6 hours is usually sufficient. It will be understood that the term "dispersion" is intended to include solutions, slurries, emulsions, etc.

It will also be understood that the nitration may be carried out by addition of the nitric acid or mixed nitration acid to a solution of the crude dibenzanthrone mixture in concentrated sulfuric of more than 65% and up to 100% concentration.

Within the stated range of proportions of nitric acid to crude dibenzanthrone mixture, and in any particular instance, higher proportions of the nitric acid yield more highly nitrated products shaded towards the green, whereas lower proportions of the nitric acid yield less nitrated products shaded towards the red. Similar variation of the concentration of the sulfuric acid diluent within the stated range affects in like manner the degree of nitration and shade of the nitrated product.

Following completion of the nitration reaction, the nitrated dibenzanthrone compound is isolated in known manner, as for example by diluting the reaction mass with water, filtering off the precipitated product, and washing the product thus separated with water.

The following examples are illustrative of the present invention and are not to be regarded as limitative. All parts and proportions referred to herein and in the appended claims, are by weight unless otherwise indicated.

*Example 1*

425 parts of 96% sulfuric acid (4.16 moles) and
45 parts crude dibenzanthrone mixture resulting from the fusion of benzanthrone in caustic potash and analyzing spectrophotometrically as above-described and containing
37.6 parts [0.0824 mole] of combined dibenzanthrone and isodibenzanthrone and
7.6 parts of unknown impurities are stirred to solution. There are then added below 70° to 75° C. in about 2 hours
257 parts of water; to adjust the sulfuric acid concentration to 60%. The temperature is then adjusted to 35° to 40° C. and there is added in about 2 hours
25 parts of mixed nitration acid, consisting of nitric acid and sulfuric acid in a ratio of 1:2 (0.131 mole of nitric acid). The reaction mixture is then stirred at 35° to 40° C. for 4 to 5 hours. The product is isolated by pouring with stirring, the reaction mass into
2000 parts of water. The precipitate is filtered off, washed with hot water and dried. The yield of product is 45.6 parts analyzing 3.32% nitrogen. This product produces on cotton and rayon from the vat excellent shades of grey to black of excellent fastness to chlorine and light which do not require any after-treatment to develop the color.

*Example 2*

The same procedure as described in Example 1 is carried out, but in this instance the amount of mixed nitration acid is 63.3 parts (0.332 mole of nitric acid). The product is obtained in a yield of 46.9 parts analyzing 3.72% nitrogen. This product produces much greener shades of black than obtained as described under Example 1.

*Example 3*

The same procedure as described in Example 1 above is repeated, except that the amount of mixed nitration acid is 23.5 parts (0.123 mole of nitric acid). The product is obtained in a yield of 44.6 parts analyzing 2.96% nitrogen. This product produces redder shades of black than obtained as described in Example 1.

This invention has been disclosed with respect to certain preferred embodiments, and there will become obvious to persons skilled in the art various modifications, equivalents or variations thereof which are intended to be included within the spirit and scope of this invention.

We claim:

1. A process for producing a direct dyeing black dyestuff comprising subjecting a slurry in 40 to 65% sulfuric acid of a crude dibenzanthrone mixture resulting from the caustic fusion of benzanthrone to treatment with a nitrating acid containing about 1–4 moles of nitric acid per mole of said mixture.

2. A process as defined in claim 1 wherein the nitrating acid is mixed nitration acid composed of about one third nitric acid and two thirds sulfuric acid.

3. A process as defined in claim 2 wherein about 20 to 65 parts of the mixed nitration acid are employed for each 45 parts of crude dibenzanthrone mixture.

4. A process for producing a direct dyeing black dyestuff comprising dissolving the crude dibenzanthrone mixture resulting from the caustic fusion of benzanthrone, in sulfuric acid having a concentration of at least about 95% in an amount at least sufficient to dissolve said mixture, adding sufficient water to the solution to reduce the concentration of the sulfuric acid to within the range of about 40 to 65%, then adding about 20 to 65 parts of mixed nitration acid, composed of about one-third nitric acid and two-thirds sulfuric acid, for each 45 parts of said crude mixture gradually to the slurry and allowing the nitration to proceed to completion, the nitration being carried out at a temperature of less than about 75° C.

References Cited in the file of this patent

UNITED STATES PATENTS

| | | |
|---|---|---|
| 1,464,598 | Daniels | Aug. 14, 1923 |
| 2,029,237 | Koeberle et al. | Jan. 28, 1936 |
| 2,052,614 | Fleysher | Sept. 1, 1936 |
| 2,831,871 | Robinson | Apr. 22, 1958 |

FOREIGN PATENTS

| | | |
|---|---|---|
| 441,919 | Great Britain | July 26, 1935 |

OTHER REFERENCES

Groggins: Unit Processes in Organic Chemistry, fourth edition (1952), page 23.